United States Patent
Rawal

[11] Patent Number: 5,876,831
[45] Date of Patent: Mar. 2, 1999

[54] HIGH THERMAL CONDUCTIVITY PLUGS FOR STRUCTURAL PANELS

[75] Inventor: Suraj Prakash Rawal, Littleton, Colo.

[73] Assignee: Lockheed Martin Corporation, Bethesda, Md.

[21] Appl. No.: 854,895

[22] Filed: May 13, 1997

[51] Int. Cl.$^6$ ........................................... B32B 3/12
[52] U.S. Cl. ........................................ 428/117; 428/118
[58] Field of Search ................................. 428/116, 117, 428/118, 593

[56] References Cited

U.S. PATENT DOCUMENTS

| | | | |
|---|---|---|---|
| 2,477,852 | 8/1949 | Bacon | 428/118 X |
| 3,018,205 | 1/1962 | Barut | 428/116 |
| 3,887,739 | 6/1975 | Kromrey | 428/112 |
| 3,922,412 | 11/1975 | Yoshikawa et al. | 428/118 |
| 4,057,101 | 11/1977 | Ruka et al. | 428/117 X |
| 4,299,872 | 11/1981 | Miguel et al. | 428/117 |
| 4,329,162 | 5/1982 | Pitcher, Jr. | 428/117 X |
| 4,546,028 | 10/1985 | Val | 428/116 |
| 4,557,962 | 12/1985 | Belmonte et al. | 428/188 X |
| 4,623,951 | 11/1986 | DuPont et al. | 428/116 X |
| 4,849,858 | 7/1989 | Grapes et al. | 361/708 |
| 4,867,235 | 9/1989 | Grapes et al. | 165/185 |
| 4,884,631 | 12/1989 | Rippel | 165/185 |
| 4,996,115 | 2/1991 | Eerkes et al. | 428/614 |
| 5,116,689 | 5/1992 | Castro et al. | 428/593 |
| 5,224,030 | 6/1993 | Banks et al. | 428/614 X |
| 5,283,099 | 2/1994 | Smith et al. | 428/116 |
| 5,288,537 | 2/1994 | Corden | 428/116 |
| 5,296,310 | 3/1994 | Kibler et al. | 428/614 |
| 5,316,080 | 5/1994 | Banks et al. | 165/185 |
| 5,390,734 | 2/1995 | Voorhes et al. | 165/185 |
| 5,407,727 | 4/1995 | Newell | 428/188 |
| 5,415,715 | 5/1995 | Delage et al. | 156/197 |
| 5,466,507 | 11/1995 | Darfler | 428/116 |
| 5,470,633 | 11/1995 | Darfler | 428/116 |
| 5,527,584 | 6/1996 | Darfler et al. | 428/116 |
| 5,542,471 | 8/1996 | Dickinson | 165/170 |

*Primary Examiner*—Henry F. Epstein
*Attorney, Agent, or Firm*—Holme Roberts & Owen LLP

[57] ABSTRACT

A thermally conductive structure for transferring heat energy transversely, relative to a heat source interconnected to the structure, is disclosed. The structure generally includes a plurality of non-metallic thermal plugs insertable into a corresponding plurality of cells of a honeycomb core. Each of the thermal plugs are primarily axially thermally conductive. The honeycomb core is sandwiched between first and second panels, the heat source being mounted on the first panel. As such, the structure with high through the thickness thermal conductivity (e.g., greater than 200 W/m °K) and conductance primarily transversely transfers heat energy from the heat source to the second panel via the plurality of thermal plugs.

22 Claims, 10 Drawing Sheets

HIGH THERMAL CONDUCTIVITY PLUGS FOR STRUCTURAL PANELS

FIELD OF THE INVENTION

The present invention generally relates to structural panels for supporting devices which generate heat. In particular, the invention offers an innovative apparatus and method of increasing through-thickness thermal conductivity (kz) and equivalently conductance in thermal management structures, thus facilitating effective heat transfer away from a heat source mounted on the structure.

BACKGROUND OF THE INVENTION

Honeycomb cores of sandwich structures are generally made up of numerous interconnected cells providing a support structure having high strength-to-weight and stiffness-to-weight ratios. Typically, honeycomb structures are made by an expansion or a corrugated process. The expansion method of fabricating honeycomb structures from a web material generally involves stacking sheets of the web material having adhesive mode lines printed thereon to form a block. After curing, the block may be expanded to the desired cell shape and then cut to appropriate dimensions. In the corrugated process for making honeycomb structures, the web material is corrugated into a number of corrugated sheets and adhesive is used to interconnect the corrugated sheets to form a block which may then be cut to appropriate dimensions. The expansion and corrugation processes are particular useful in fabricating honeycomb cores out of metallic and non-metallic materials. Other processes for making honeycomb structures, such as from composites, involve fusing the nodes together.

Honeycomb cores fabricated in accord with the processes outlined hereinabove may be used in the aerospace, transportation, recreation and marine industries to fabricate honeycomb core sandwich structures. Such honeycomb structures are particularly useful in the aerospace field, where lightweight and high strength structures are required. For example, in aircraft structures, honeycomb panels have been used in wings and to support various devices within an aircraft. For spacecraft applications, honeycomb structures should be lightweight in view of payload weight limitations for launching spacecraft, and the honeycomb structures should also be structurally stable, as such honeycomb structures may function as a load bearing members. For example, honeycomb structures may support a variety of devices within the interior of the spacecraft, such as batteries or other electronic components.

SUMMARY OF THE INVENTION

Accordingly, it is an object of the present invention to provide a lightweight honeycomb-style structure capable of supporting devices mounted thereon.

It is another object of the present invention to provide a honeycomb structure capable of functioning as a heat sink by dissipating heat energy away from devices mounted thereon.

It is a further object of the present invention to provide a thermal management structure for efficiently dissipating heat energy away from a heat source, through the structure, relative to the heat source.

The above-noted objects of the present invention are achieved by inserting at least a first thermal plug into at least a first cell of a honeycomb structure or core having a plurality of interconnected cells. Generally, for purposes of efficiently dissipating heat energy away from a heat source interconnected to (e.g., mounted on) the honeycomb core via a first panel (e.g., facesheet) interposed between the heat source and honeycomb core, and away from other heat sources interconnected to the honeycomb core via the first panel, the thermal plugs of the present invention are positionable below the heat source and are capable of quickly and efficiently transferring heat energy in the through-thickness direction of the honeycomb core (e.g., transversely away from and relative to the heat source), from a top side of the first panel and toward a bottom side (e.g., second panel or facesheet) of the honeycomb core. In this regard, the structure of the present invention is directed to primarily transferring heat energy away from the heat source in a direction parallel to the walls of the interconnected cells of the honeycomb core, and may also exhibit in-plane heat transfer, where heat energy in conducted in a direction perpendicular to the walls of the interconnected cells of the honeycomb structure or radially outwardly away from the heat source, via the first panel. This in-plane heat transfer is ensured by using high heat conductivity facesheets for the honeycomb core structures.

In one embodiment, at least a first thermal plug of the present invention is primarily thermally conductive along its longitudinal axis (i.e., along its length, in a direction parallel to the walls of the interconnected cells of the honeycomb core). Further, for purposes of providing a thermal plug capable of rapidly dissipating heat energy at least transversely away from the heat source (e.g., through the thickness of the honeycomb core), the thermal plugs of the present invention have an axial thermal conductivity of at least about 200 W/m °K. In a preferred embodiment, the thermal conductivity of the structure, relative to a heat source interconnected thereto, is significantly greater in a direction perpendicular to the heat source (e.g., parallel to the walls of the interconnected cells) than in a direction perpendicular to the walls of the interconnected cells of the honeycomb structure. In this regard, the transverse or through-thickness thermal conductivity of the structure relative to the heat source interconnected thereto may be greater than the thermal conductivity of at least the first panel in a direction perpendicular to the walls of the interconnected cells of the honeycomb structure, and may be greater than the in-plane or radial thermal conductivity of the first panel (e.g., radially outwardly from the heat source, along the first panel). As such, the transverse or through the thickness thermal conductivity of at least the first thermal plug may be greater than the thermal conductivity, in directions perpendicular to the walls of the interconnected cells, of the first panel or facesheet supporting the heat source. Such thermal conductivity properties of at least the first thermal plug relative to the first panel contribute to the propensity for the heat energy to transfer from the heat source transversely through the first panel, and into and through at least the first thermal plug.

To provide such transverse or through-the thickness thermal conductivity while minimizing increases in weight of the structure, the thermal plugs of the present invention are fabricated from a material having a high thermal conductivity and low density. In one embodiment, the thermal plugs of the present invention are fabricated from a material selected from the group consisting of light metals, such as aluminum, aluminum alloys and copper, composites and non-metallic materials having an axial (e.g., along the length of the thermal plug) thermal conductivity of at least about 200 W/m °K. In a preferred embodiment, the thermal plugs of the present invention are fabricated from a high conductivity non-metallic or composite material, such as self-reinforced graphite having axially aligned fibers therein, isotropic carbon—carbon, ceramics, diamond particles or chopped vapor grown carbon fibers with a compatible binder. Such thermal plugs have a higher thermal conductivity than aluminum or aluminum alloys.

In another embodiment, at least a first thermal plug is configured to be insertable into at least a first cell of a plurality of interconnected cells in a honeycomb core sandwiched between first and second panels (e.g., facesheets) to facilitate the transverse or through the thickness transfer of heat energy from a heat source mounted on the first panel. Of importance, for purposes of optimizing the transverse heat transfer from the heat source to the second panel, the cross-sectional area of the thermal plugs may be selected. In this regard, the cross-sectional configuration of the thermal plugs may correspond to the cross-sectional configuration of the interconnected cells of the honeycomb core to maximize the area of contact between the top and bottom surfaces of the thermal plugs with the first and second panels, respectively. For example, for a honeycomb core comprising a plurality of hexagonal cells, the thermal plugs insertable therein may have a hexagonal cross-section, thereby providing the maximum surface area for contact between the top and bottom surfaces of the thermal plugs and the first and second panels interconnected thereto. Alternatively, for purposes of facilitating the manufacture of thermal plugs of the present invention while providing sufficient surface area for contact between the thermal plugs and the first and second panels to allow the transverse transfer of heat energy from the heat source to the second panel via the thermal plugs, the thermal plugs may have a square or rectangular cross-section, or may have a circular cross-section, which provide about 80% and about 60% of the surface area of contact, respectively, of hexagonal thermal plugs. In this regard, at least the first thermal plug may have a one of a number of cross-sectional configurations, such as square, rectangular, circular, hexagonal and/or triangular. Further, for purposes of providing an efficient heat transfer path from the heat source to the second panel, at least the first thermal plug may be sized to substantially fill at least the first cell, such that the first thermal plug extends at least between and is interconnected to the first and second panels. In addition, for purposes of further enhancing the thermal conductivity of the structure while keeping the plugs within corresponding cells of the honeycomb structure, the top and bottom surfaces of at least the first thermal plug may be bonded to the first and second panels via a thermally conductive adhesive.

In another embodiment, a structure including at least a first plurality of thermal plug insertable into at least a first plurality of interconnected cells of a honeycomb core is disclosed for transferring heat energy away from a heat source. For purposes of providing a thermal management structure having enhanced heat transfer capabilities while minimizing weight increases, the first plurality of thermal plugs may be inserted into the first plurality of interconnected cells located below the heat source. In some instances, the heat source is contained within an enclosure (e.g., box). In one embodiment, the cross-sectional area (e.g., footprint) of the first plurality of interconnected cells and first plurality of thermal plugs inserted therein substantially corresponds to the cross-sectional area of the enclosure containing the heat source. In another embodiment, for purposes of maximizing the efficacy of the heat transfer while providing a lightweight structure, the cross-sectional area (e.g., footprint) covered by the first plurality of interconnected cells and first plurality of thermal plugs inserted therein substantially corresponds to the cross-sectional area (e.g., footprint) of the heat source within the enclosure, and does not correspond to the cross-sectional area (e.g., footprint) of the enclosure.

In another embodiment, the present invention is directed to a structure for further for enhancing the transverse or through the thickness heat transfer from a heat source. In this embodiment, the structure includes a first honeycomb core sandwiched between first and second panels and at least a first thermal plug inserted into at least a first cell of the honeycomb core, below the heat source which is interconnected to the first panel. For purposes of enhancing the transverse or through the thickness heat transfer rate, the heat source is mounted directly on the first panel (e.g., facesheet).

DETAILED DESCRIPTION OF THE INVENTION

Figure 1:
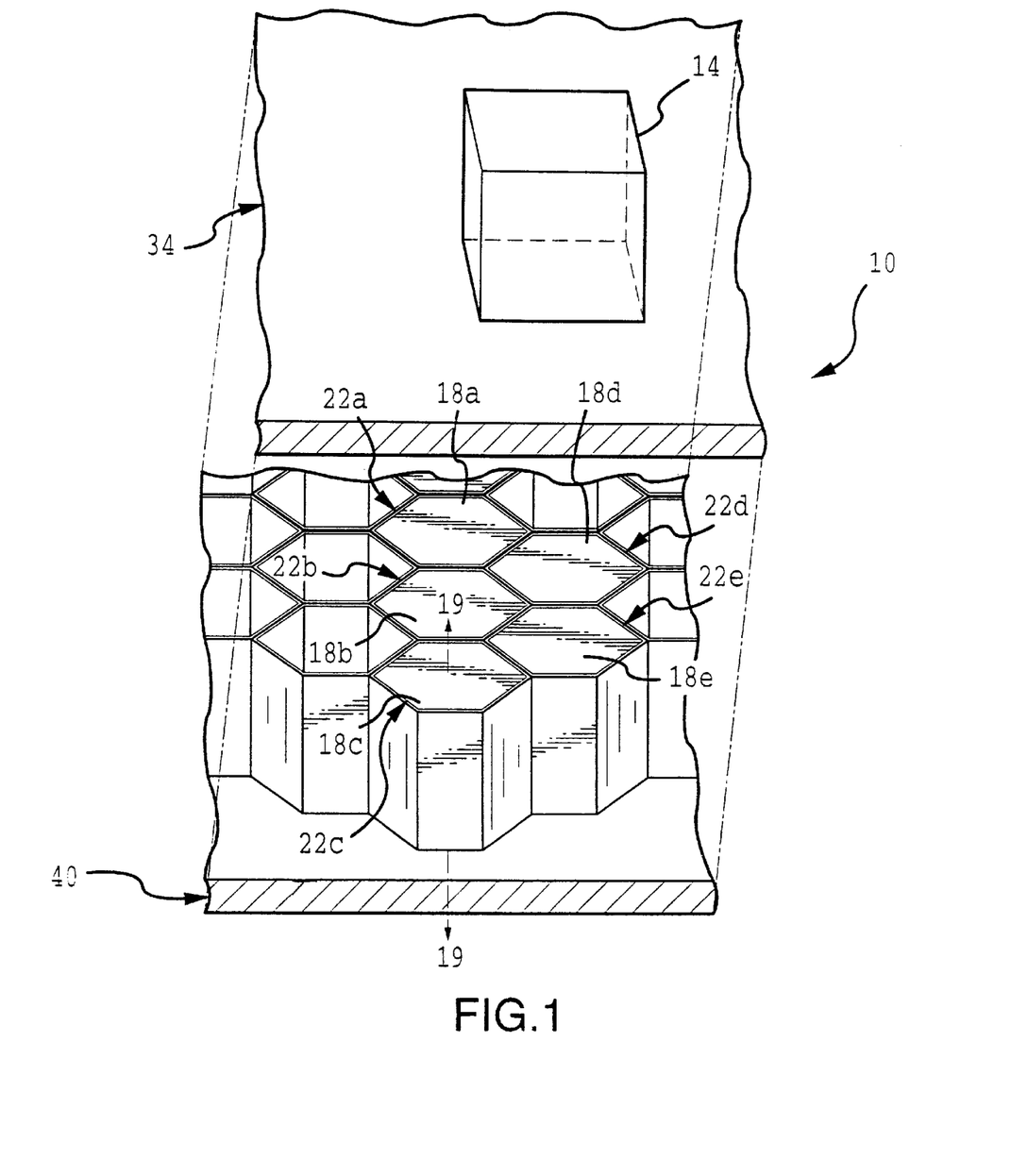
FIG. 1 is an exploded view of the structure of the present invention supporting a heat source interconnected thereto, the structure having a plurality of thermal plugs inserted into interconnected cells of the honeycomb core of the structure.

FIGS. 1–9 illustrate a thermally conductive structure embodying the features of the present invention. FIG. 1 illustrates an exploded view of the thermal management structure 10 and a heat source 14 (e.g., devices, such as electronic components, batteries, motors, etc., in which heat is generated during operation thereof) interconnected thereto. Generally, the purpose of the structure 10 is to dissipate or transfer heat energy generated by the heat source 14 away from the heat source 14. In particular, the structure 10 of the present invention functions to primarily transfer heat energy away from and relative to the heat source 14, through the thickness of the structure 10. Such heat transfer away from the heat source 14 may enhance the performance of the heat source 14 or other electronic components positioned proximate the heat source 14 by allowing the heat source 14 and other components to operate under acceptable thermal conditions. In this regard, the structure 10 of the present invention is particularly useful in a variety of aircraft, spacecraft, marine, recreation and ground transportation applications where strong, lightweight structures capable of transferring heat away from heat sources interconnected thereto are desirable. For instance, the structure 10 of the present invention can be used as a coldplate/baseplate for mounting batteries or electronic components, an equipment panel, a base for an electronic enclosure, a heat sink or other thermal management components.

Referring to FIG. 1, the structure 10 generally comprises a plurality of thermal plugs 18 positionable (e.g., insertable) into a corresponding plurality of interconnected cells 22 of a honeycomb core or member 28, which is sandwiched between and interconnected to the first and second panels or facesheets 34, 40 of the structure 10. As illustrated in FIG. 1, at least one thermal plug or core fill 18 is interconnectable to the heat source 14 via the first panel 34 interposed between the heat source 14 and the cells 22 of the honeycomb core 28 and thermal plugs 18 positioned therein. To ensure intimate contact or bonding between the first and second panels 34, 40 and the ends 20, 21 of the thermal plug 18, a thermally conductive adhesive is used. In one embodiment of the structure 10, a plurality of thermal plugs 18 (e.g., 18a, 18b, 18c, 18d, 18e) may be inserted into a corresponding plurality of interconnected cells 22 (e.g., 22a, 22b, 22c, 22d, 22e) of the honeycomb core 28, the plurality of interconnected cells 22a–22e being located substantially below the heat source 14. For purposes of transferring any heat energy generated by the heat source 14 away from the heat source 14 transversely, relative to the heat source 14 (e.g., through the thickness), and into the second panel 40, the thermal plugs 18 of the present invention are at least axially thermally conductive (e.g., thermally conductive at least along or parallel to a longitudinal axis of each plug 18, in a direction parallel to the walls of the interconnected cells 22). In a preferred embodiment, the thermal plugs 18 are primarily axially thermally conductive. In particular, in this preferred embodiment, the thermal plugs 18 have an axial thermal conductivity which is greater than the thermal conductivity of the thermal plugs 18 in a direction parallel to the top and bottom surfaces 20, 21 of each thermal plug 18.

For purposes of providing a lightweight structure, the thermal plugs or vias 18 of the present invention may be fabricated from one of a non-metallic and a composite material. Further, in order to provide a structure 10 capable of efficiently transferring heat energy transversely relative to the heat source 14, the thermal plugs 18 have an axial thermal conductivity (e.g., in a direction parallel to the longitudinal axis 19 of each thermal plug 18) of at least about 200 W/m °K. In a preferred embodiment, the thermal plugs 18 are fabricated from a highly conductive non-metallic material, such as self-reinforced graphite (commercially available from Amoco Performance Products) having an axial thermal conductivity of between about 300 W/m °K and about 800 W/m °K or isotropic carbon—carbon (commercially available from B.F. Goodrich Supertemp) having an axial thermal conductivity of about 200 W/m °K. Alternatively, the thermal plugs 18 are fabricated from ceramics (e.g., aluminum nitride, beryllia), diamond, pyrolytic graphite or high conductivity materials such as diamond particles having a thermal conductivity of between about 300 W/m °K and about 2000 W/m °K, chopped vapor grown carbon fibers having a thermal conductivity of at least about 1500 W/m °K in an organic binder as a vehicle or carrier.

In addition, in order to minimize any weight increase to the structure 10 resulting from the addition of the thermal plugs 18, the thermal plugs 18 are fabricated from a material having a density less than the density of thermally conductive metals, such as aluminum. In this regard, in comparison to a honeycomb structure having metallic plugs inserted in cells of the honeycomb structure, the structure 10 of the present invention having non-metallic thermal plugs 18 adds less weight to the structure while enhancing the thermal conductivity of the structure. In one embodiment, the thermal plugs 18 are fabricated from a non-metallic material having a density of less than about 0.1 lb/in$^3$. For example, the thermal plugs 18 may be fabricated from self-reinforced graphite having a density of about 0.066 lb/in$^3$.

Figure 2:
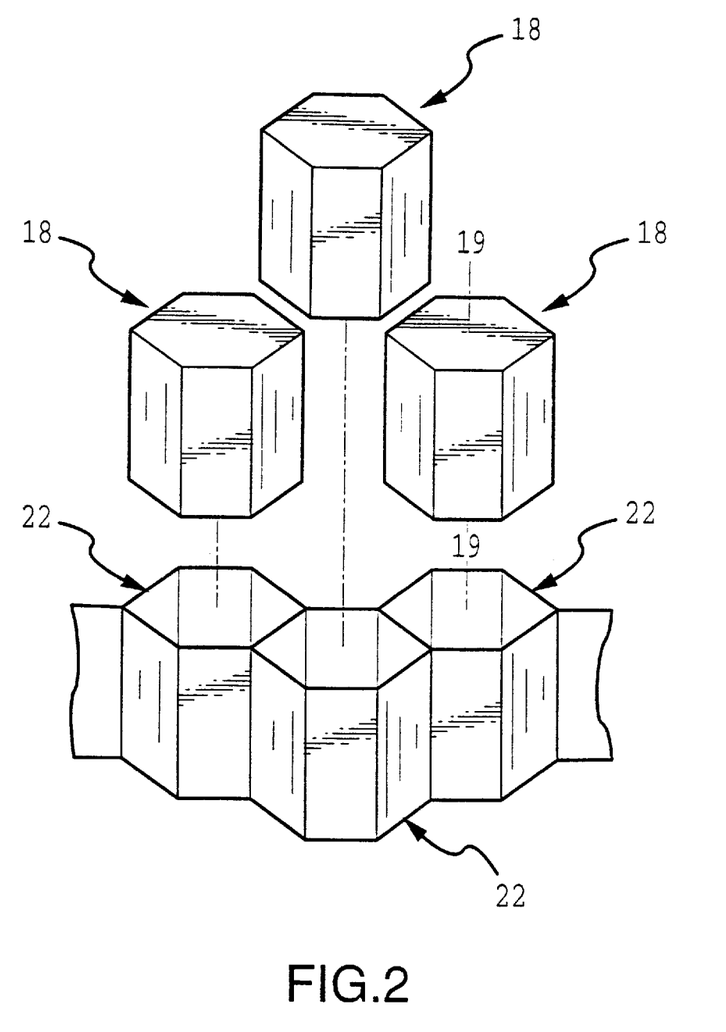
FIG. 2 is an exploded view of one embodiment of the thermal plugs and honeycomb core of the present invention.
Figure 3:
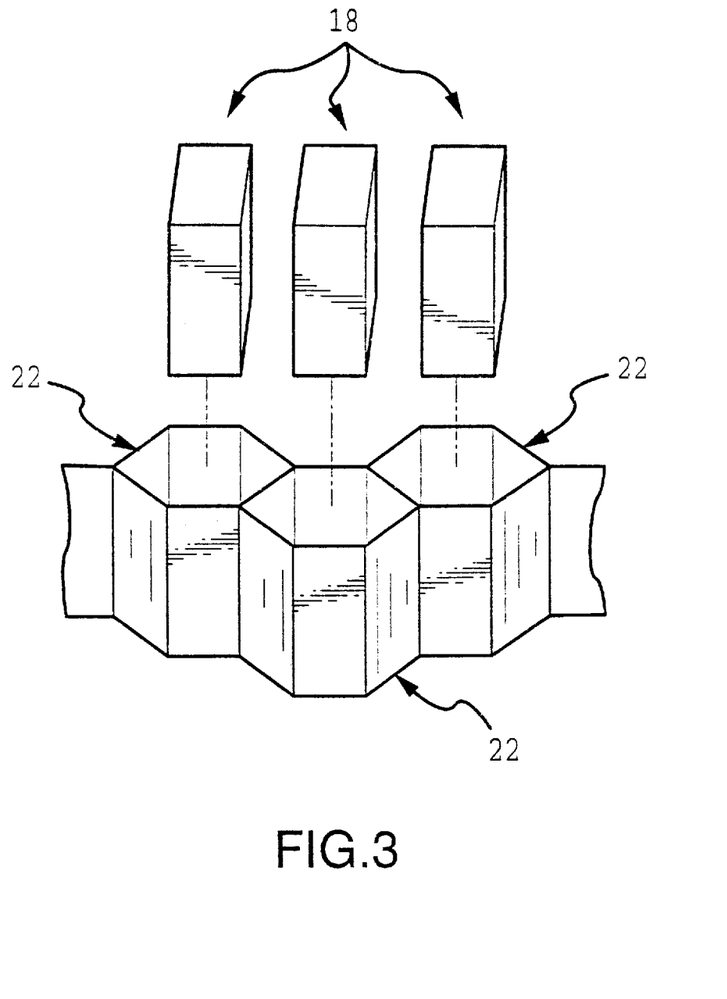
FIG. 3 is an exploded view of another embodiment of the thermal plugs and honeycomb core of the present invention.
Figure 4:
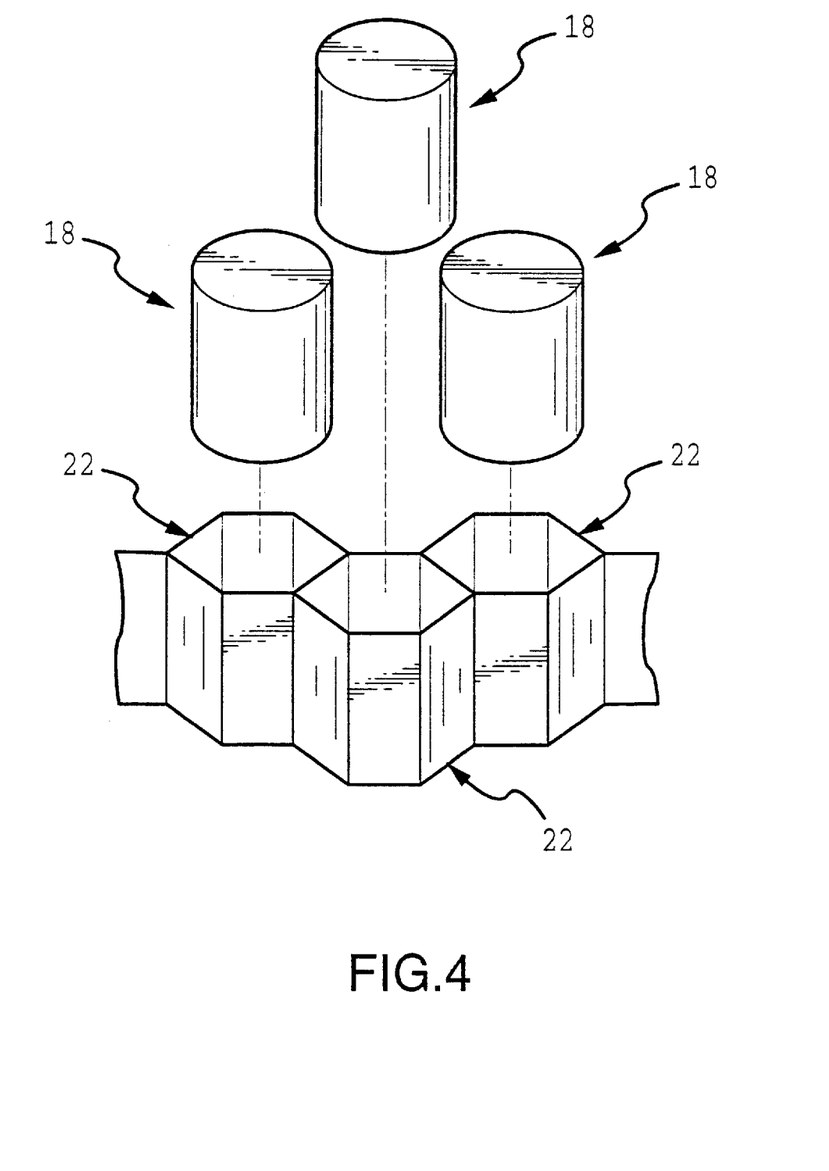
FIG. 4 is an exploded view of another embodiment of the thermal plugs and honeycomb core of the present invention.
Figure 5:
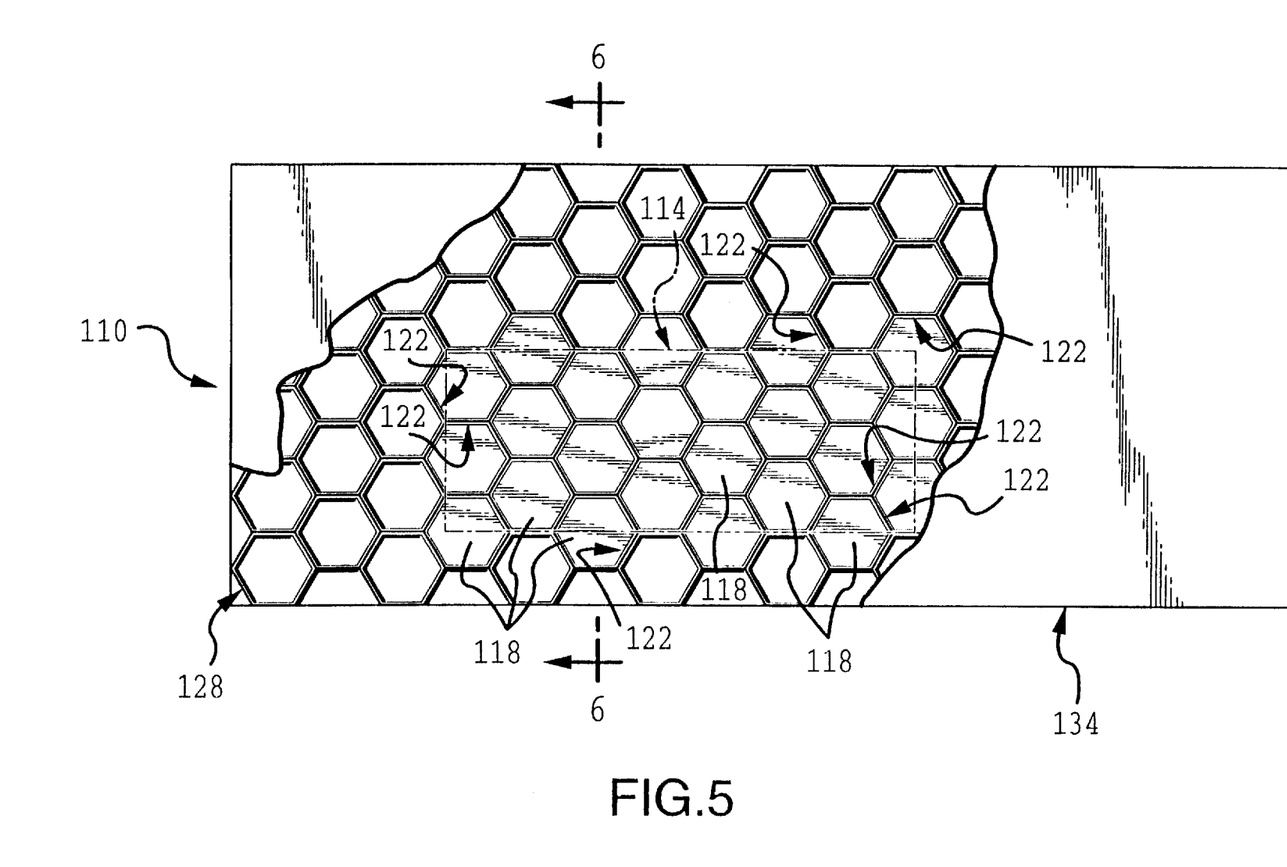
FIG. 5 illustrates one embodiment of the structure of the present invention, the first panel of the structure being cut-away to show the interconnected cells of the honeycomb core and thermal plugs inserted therein, below the heat source.
Figure 6:
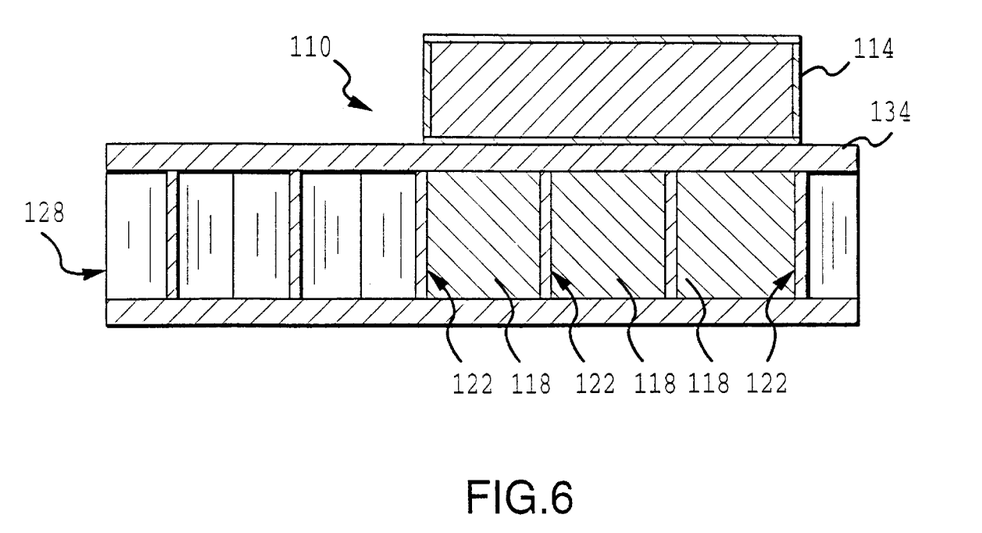
FIG. 6 is a cross-sectional view of the structure illustrated in FIG. 5.
Figure 7:
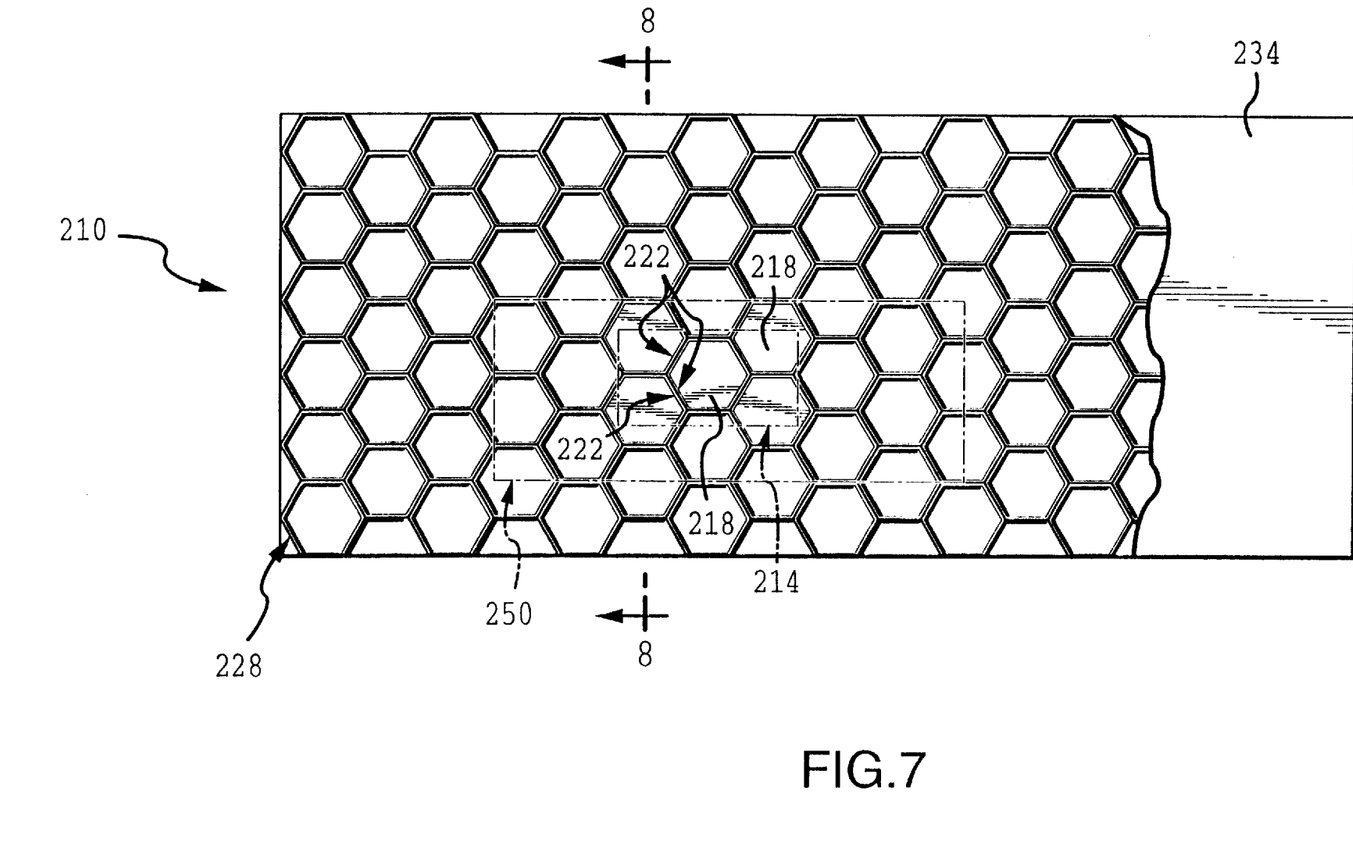
FIG. 7 illustrates another embodiment of the structure of the present invention, the first panel of the structure being cut-away to show the interconnected cells of the honeycomb core and the thermal plugs inserted therein, below the heat source.
Figure 8:
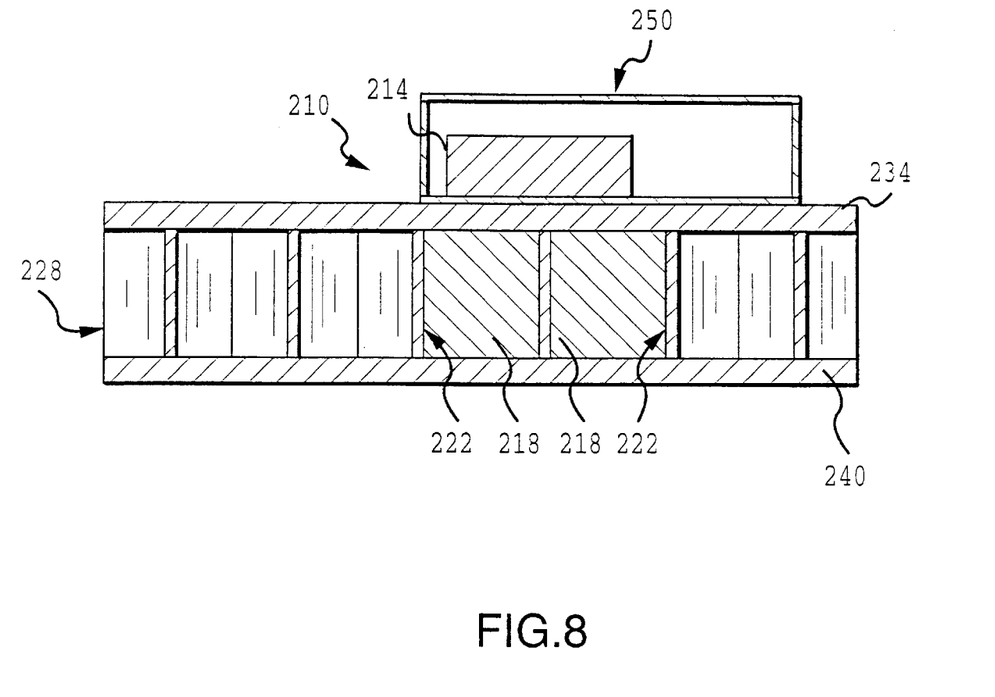
FIG. 8 is a cross-sectional view of the structure illustrated in FIG. 7.

The thermal plugs 18 of the present invention are configured to be insertable within the cells 22 of the honeycomb core 28. In addition, for purposes of enhancing the thermal conductivity of the structure 10 by maximizing the area of contact between the top surface 20 of each of the thermal plugs 18 with the bottom surface 36 of the first panel 34, the cross-sectional configuration of the thermal plugs 18 may be selected. As illustrated in FIGS. 2–4, the thermal plugs 18 of the present invention may have hexagonal, rectangular (e.g., square) or circular cross-sectional configurations. In one embodiment, illustrated in FIG. 2, the thermal plugs 18 have a hexagonal cross-sectional configuration and are sized to extend between the walls of the corresponding cells 22. In other embodiments, where the thermal plugs 18 have a rectangular or circular cross-sectional configuration, the thermal plugs 18 have a dimension (e.g., diameter, width, etc.) corresponding to a distance between opposing walls of a cells 22. In a preferred embodiment, for purposes of enhancing thermal conductivity of the structure 10, the thermal plugs 18 are hexagonal in cross-sectional configuration and are sized to extend between the walls of each cell 22, as thermal plugs 18 having rectangular or circular cross-sectional configurations have about 80% and about 60%, respectively, less surface area than such hexagonal thermal plugs 18.

The length of the thermal plugs 18 of the present invention may also selected to further enhance the transverse thermal conductivity of the structure 10. In one embodiment, the thermal plugs 18 have a length which generally corresponds to the distance between the top and bottom surfaces of each cell 22. In this regard, the thermal plugs 18 of the present invention substantially fills each of the selected cells 22 of the structure 10, as illustrated in FIG. 1, such that the thermal plugs 18 extend at least between the first and second panels 34, 40. In one embodiment, the thermal plugs 18 are manufactured to have a length which is slightly greater than the distance between the top and bottom surfaces of the honeycomb core 28. For example, for a honeycomb core 28 having a height, as defined by the top and bottom surfaces of about 0.5 inches, the thermal plugs 18 may be cut to have a length of about 0.51 inches to ensure that the thermal plugs 18 extend between the first and second panels 34, 40 of the structure 10.

In one embodiment, the thermal plugs 18 are cut to an appropriate length. As a result of such cutting, the top and bottom surfaces of the thermal plugs 18 may not be perfectly smooth and in fact may be rough. For purposes of enhancing the thermal conductivity from the heat source 14 to the thermal plugs 18 by ensuring intimate contact between the top surface of the thermal plug 18 with the bottom facesheet of the first panel 34, a thermally conductive adhesive may be applied to at least the top surfaces of the thermal plugs 18 to bond the thermal plugs 18 to the bottom surface of the first panel 34 of the structure 10. A thermally conductive adhesive may be similarly applied to the bottom surfaces of the thermal plugs 18 to ensure intimate contact between the thermal plugs 18 and the second panel 40. In this regard, a thermal pathway from the heat source 14 to the second panel 40 is provided. Further, a thermally conductive adhesive may be used to ensure intimate contact between the thermal plugs 18 and the walls of the cells 22 of the honeycomb core 28. Thermally conductive adhesives suitable for these uses include DIS-A-PASTE 2056A. In addition, at least one of the first and second panels 34, 40 may be bonded via an adhesive (e.g., 9309.2 NA, EA 9394, etc.) to the honeycomb core 28 to provide the structure 10 with structurally stability. In an alternative embodiment, a nonconductive adhesive is used to bond the top and bottom surfaces of the thermal plugs 18 to the first and second panels 34, 40 and/or to bond at least a side surface of the thermal plugs 18 to the walls of the cells 22.

For purposes of enhancing thermal conductivity of the structure while limiting the increase in weight of the structure due to the addition of the thermal plugs, the number of thermal plugs positioned within the cells of the honeycomb core may be varied and the specific cells in which the thermal plugs are inserted may be selected. In one embodiment of a structure 110, illustrated in FIGS. 5 and 6, a plurality of thermal plugs 18 of the present invention may be positioned in a corresponding plurality of selected cells 122, the selected cells 122 being located and occupying a region of the honeycomb 128 below a first area defined by the cross-sectional area or footprint of the heat source 114 (e.g., battery) which is interconnected to the first panel 134.

Figure 9:
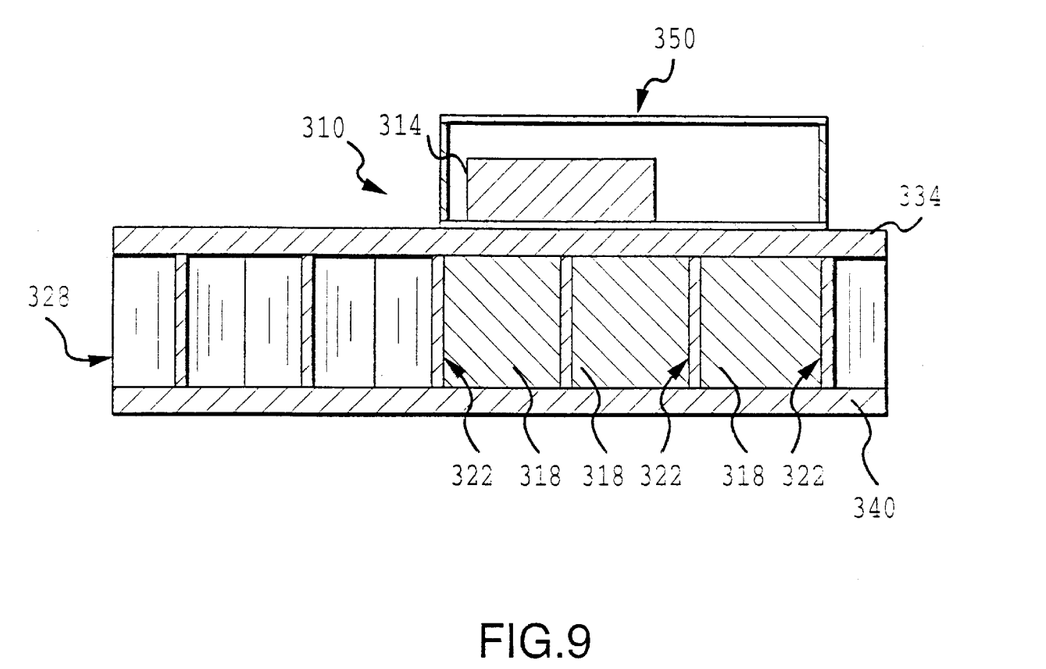
FIG. 9 is a cross-sectional view of another embodiment of the structure illustrated in FIG. 8.

In other instances, the heat source may be contained within a box or enclosure. In such instances, the number of thermal plugs positioned within the cells of the honeycomb core may be varied and the specific cells in which the thermal plugs are inserted may be selected. In one embodiment, illustrated in FIGS. 7 and 8, a heat source 214 having a first cross-sectional area or footprint is contained within an enclosure 250 having a second cross-sectional area which is greater than the first cross-sectional area of the heat source 214. In this embodiment, the plurality of thermal plugs 218 is positionable in a corresponding plurality of selected cells 222 of the honeycomb core 228 which is sandwiched between first and second panels 234, 240. More specifically, in this embodiment, the thermal plugs 218 are insertable in selected cells 222 which are located below the heat source 214, as opposed to being positioned within cells 222 below the enclosure 250 containing the heat source 214. In an alternative embodiment, the cross-section of which is illustrated in FIG. 9, the thermal plugs 318 may also be inserted into cells 322 which are located below the enclosure 350.

For purposes of illustrating the improved thermal conductivity of a structure 10 having the features of the present invention, test results are provided hereinbelow. In a first test, as a baseline, the thermal resistance of a standard 2 inch×2 inch×0.5 inch sandwich panel having unfilled cells was measured to be about 5.12° C./W. The thermal resistance of this unfilled sandwich panel were measured against the thermal resistance of a 2 inch×2 inch×0.5 inch sandwich panel having a 1 inch diameter region of the cells filled with self-reinforced graphite thermal plugs of the present invention. Transverse, relative to a heat source, thermal conductance measurements were made using a test configuration which placed a sandwich panel having self-reinforced graphite thermal plugs between two 2 inch×2 inch×0.5 inch aluminum blocks having temperature sensors positioned therein. Thermal grease was applied between the surfaces of the filled sandwich panel and aluminum blocks. The honeycomb core of the filled sandwich panel of the test was a 3.1 PCF core. During the test, it was noted that at 15 W heat input, the average temperature of the region defined by the cells filled with self-reinforced graphite thermal plugs of the present invention was 25° C. lower than the unfilled sandwich panel. The test revealed that the thermal resistance of the region defined by the cells filled with self-reinforced graphite thermal plugs was almost 4° C./W lower (e.g., 0.9° C./W) than the thermal resistance in the unfilled sandwich panel.

Figure 10A:
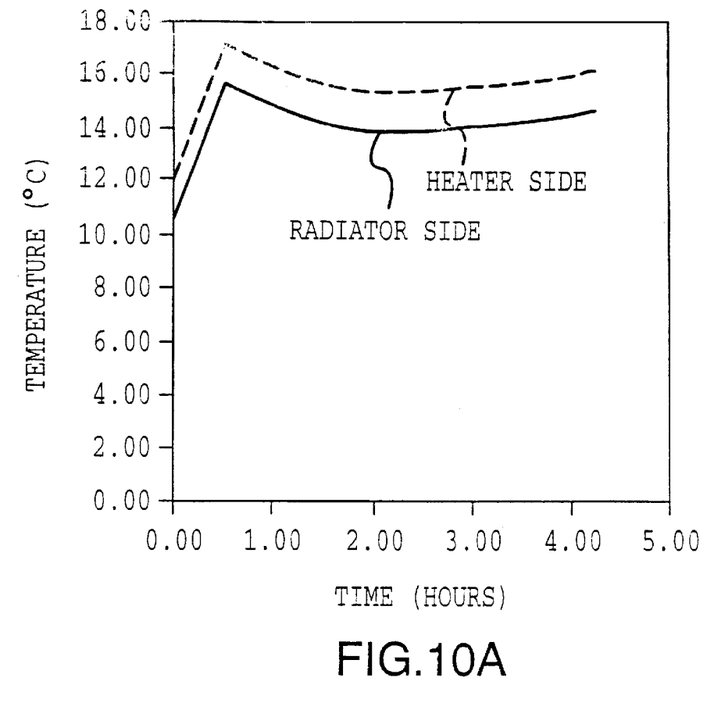
FIGS. 10A and 10B illustrate tests results of temperature difference across a honeycomb panel in a honeycomb panel having thermal plugs inserted therein and a non-filled area of the honeycomb panel.
Figure 10B:
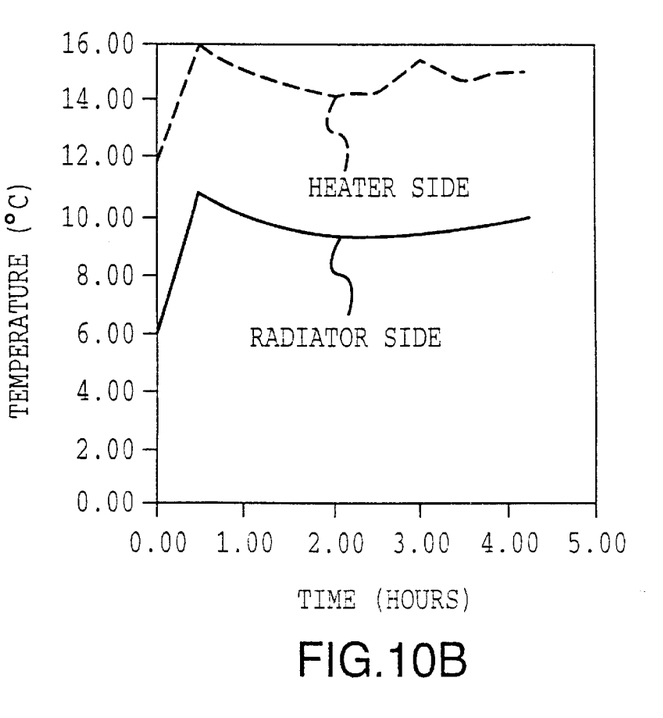

A second test was performed in a 5 foot diameter×10 foot long thermal vacuum chamber. Heaters were applied to the bottoms side of the test article. The top side of the test article faced the cold shroud of the chamber and the bottom side of the test article was blanketed with multilayered insulation. Thermocouples were placed on both sides of the test article to measure temperatures. The temperatures were recorded on an acurex data recorder and a personal computer. The test article was suspended inside the chamber using stainless steel wire to minimize parasitic heat losses. During the test, 26 watts was applied to the 2 inch×8 inch heated area and 13 watts was applied to the 2 inch×4 inch heated area. The condition was held until the test article reached equilibrium. The results of the second test showed that the thermal plugs of the present invention work well as a high conductivity filler to enhance the through thickness conductances of a honeycomb panel. The temperature difference across the thermal core filled portion of the honeycomb panel was about 1.4° C. while in a non-filled area of the honeycomb panel the temperature difference was about 5.1° C. This represents an improvement in through thickness honeycomb panel conductance by a factor of 3.6. FIGS. 10A–10B illustrate the results of the second test to show the temperature difference across the honeycomb panel in the thermal core filled area and a non-filled area of the honeycomb panel.

The honeycomb core of the present invention may be fabricated from metallic (e.g., aluminum), non-metallic (e.g., glass reinforced plastic) or composite materials, by methods well-known to those skilled in the art, or alternatively, can comprise an isogrid structure. For example, the honeycomb core may be an adhesively bonded honeycomb made by expanded and corrugated methods. Alternatively, the honeycomb core may be made by heat fusing the nodes of the honeycomb core together, which does not require an adhesive.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A thermal management structure for transferring heat energy away from a heat source, said structure comprising:

a honeycomb core having a plurality of interconnected cells extending transversely through said honeycomb core;

at least a first panel interposable between the heat source and a top surface of said honeycomb core, the heat source being interconnectable to a top surface of said first panel and positionable over at least a portion of a first of said plurality of interconnected cells; and at least a first thermal plug, insertable in said first cell, for transferring heat energy transversely, away from the heat source toward a bottom surface of said first thermal plug, wherein said first thermal plug comprises a non-metallic material having an axial thermal conductivity of at least about 200 W/m °K.

2. A structure, as claimed in claim 1, wherein at least a top surface of said first thermal plug is bonded to a bottom surface of said first panel via a thermally conductive adhesive.

3. A structure, as claimed in claim 2, wherein at least said top surface of said honeycomb core is interconnected to said bottom surface of said first panel via said thermally conductive adhesive.

4. A structure, as claimed in claim 1, wherein at least said first cell has a hexagonal cross-sectional configuration and at least said first thermal plug insertable into at least said first cell has a cross-sectional configuration selected from the group consisting of square, rectangular, circular, triangular and hexagonal.

5. A structure, as claimed in claim 1, further comprising:

a second panel interconnectable to a bottom surface of said honeycomb core, wherein at least said first thermal plug extends between said first and second panels to transfer heat energy transversely from the heat source to at least the second panel.

6. A structure, as claimed in claim 1, wherein said non-metallic material of said first thermal plug comprises a material selected from the group consisting of self-reinforced graphite, isotropic carbon—carbon, ceramics, diamond particles and chopped vapor grown carbon fibers.

7. A structure, as claimed in claim 1, wherein said non-metallic material of said first thermal plug comprises a plurality of axially-oriented self-reinforced graphite fibers.

8. A structure, as claimed in claim 1, wherein the heat source is positionable over at least a portion of a second of said plurality of interconnected cells, said second cell being located adjacent said first cell, said structure further comprising:

at least a second thermal plug positionable in said second cell for transferring heat energy transversely, away from the heat source toward a bottom surface of said second thermal plug, wherein said second thermal plug comprises a non-metallic material.

9. A high thermal conductivity system for use in at least a first cell of a number of interconnected cells in a first honeycomb member supporting a heat source interconnected thereto, the first cell being located below the heat source and defining a first bore wall transversely through the first honeycomb member, said system comprising:

at least a first thermal plug having top and bottom surfaces and at least three side surfaces extending between said top and bottom surfaces, said first thermal plug being insertable within the first cell, wherein said first thermal plug comprises a non-metallic material for transferring heat energy transversely, relative to and away from the heat source, towards at least said bottom surface of said first thermal plug; and a thermally conductive adhesive, appliable to at least said top surface and at least one of said side surfaces of said first thermal plug, for interconnecting said first thermal plug to the heat source.

10. A structure, as claimed in claim 9, wherein at least the first cell of the first honeycomb member is fabricated from one of a metallic, non-metallic and composite material, wherein the non-metallic material of said first thermal plug has a through the thickness heat transfer rate greater than the heat transfer rate in the transverse direction, relative to the heat source, of the material of said first cell.

11. A structure, as claimed in claim 9, wherein said first thermal plug has a first cross-section selected from the group consisting of hexagonal, square, rectangular, circular and triangular, wherein said first thermal plug fills the first cell.

12. A structure, as claimed in claim 9, wherein the non-metallic material of said first thermal plug has a transverse thermal conductivity of at least about 200 W/m °K.

13. A structure, as claimed in claim 9, further comprising:

a first panel interposed between the heat source and said thermally conductive adhesive on said top surface of said first thermal plug to interconnect the heat source thereon to said first thermal plug, wherein the heat source is mounted on said first panel, wherein at least a portion of the heat source is positioned above at least the first cell.

14. A structure, as claimed in claim 9, further comprising:

first and second panels interconnected to at least the first cell interposed therebetween, wherein the heat source is mounted on a top surface of said first panel, wherein at least said first thermal plug transversely transfers heat energy away from the heat source and into said second panel.

15. A structure, as claimed in claim 14, wherein said top and bottom surfaces of at least said first thermal plug are bonded to said first and second panels via said thermally conductive adhesive.

16. A structure, as claimed in claim 9, wherein the heat source is contained within a first enclosure, wherein a cross-sectional area defined by the first enclosure is greater than a cross-sectional area defined by the heat source, wherein a first plurality of thermal plugs including said first thermal plug is inserted in a first plurality of interconnected cells including the first cell, wherein the first plurality of interconnected cells has a first cross-sectional area corresponding to the cross-sectional area of the heat source.

17. A structure for transversely transferring heat energy away from at least a first heat source, said structure comprising:

first and second facesheets each having top and bottom surfaces, wherein the heat source is interconnected to said top surface of said first facesheet;

a honeycomb core sandwiched between and interconnected to said first and second facesheets, wherein said honeycomb core comprises at least a first plurality of interconnected cells, said first plurality of interconnected cells being located below the heat source; and a first plurality of thermal plugs, insertable into said first plurality of said interconnected cells, for transferring heat energy transversely, away from the heat source and into said second facesheet, wherein at least a first thermal plug of said first plurality of thermal plugs comprises a non-metallic material having a thermal conductivity in a first direction parallel with at least a first wall of at least a first cell of said first plurality of interconnected cells of at least about 200 W/m °K.

18. A structure, as claimed in claim 17, wherein top and bottom surfaces of at least said first thermal plug is bonded to said first and second facesheets, respectively, and at least a first side surface of at least said first thermal plug is bonded to at least a first wall of a first cell of said first plurality of interconnected cells via a thermally conductive adhesive.

19. A structure, as claimed in claim 17, wherein the heat source is contained within a first enclosure, wherein a cross-sectional area defined by the first enclosure is greater than a cross-sectional area defined by the heat source, wherein said first plurality of thermal plugs inserted in said first plurality of interconnected cells has a first cross-sectional area corresponding to the cross-sectional area of the heat source.

20. A structure, as claimed in claim 17, wherein said interconnected cells of said honeycomb core are fabricated from a material selected from the group consisting of metallic materials, non-metallic materials and composites.

21. A structure, as claimed in claim 17, wherein the thermal conductivity of said at least said first thermal plug in said first direction is greater than the thermal conductivity of said first thermal plug in a second direction perpendicular with at least said first wall of at least said first cell of said first plurality of interconnect cells.

22. A structure, as claimed in claim 17, wherein at least said first thermal plug is fabricated from a non-metallic material having a density of less than about 0.1 lb/in$^3$.

* * * * *